No. 743,891. PATENTED NOV. 10, 1903.
L. KREITINGER.
DRAFT COUPLING.
APPLICATION FILED FEB. 11, 1903.
NO MODEL. 2 SHEETS—SHEET 2.
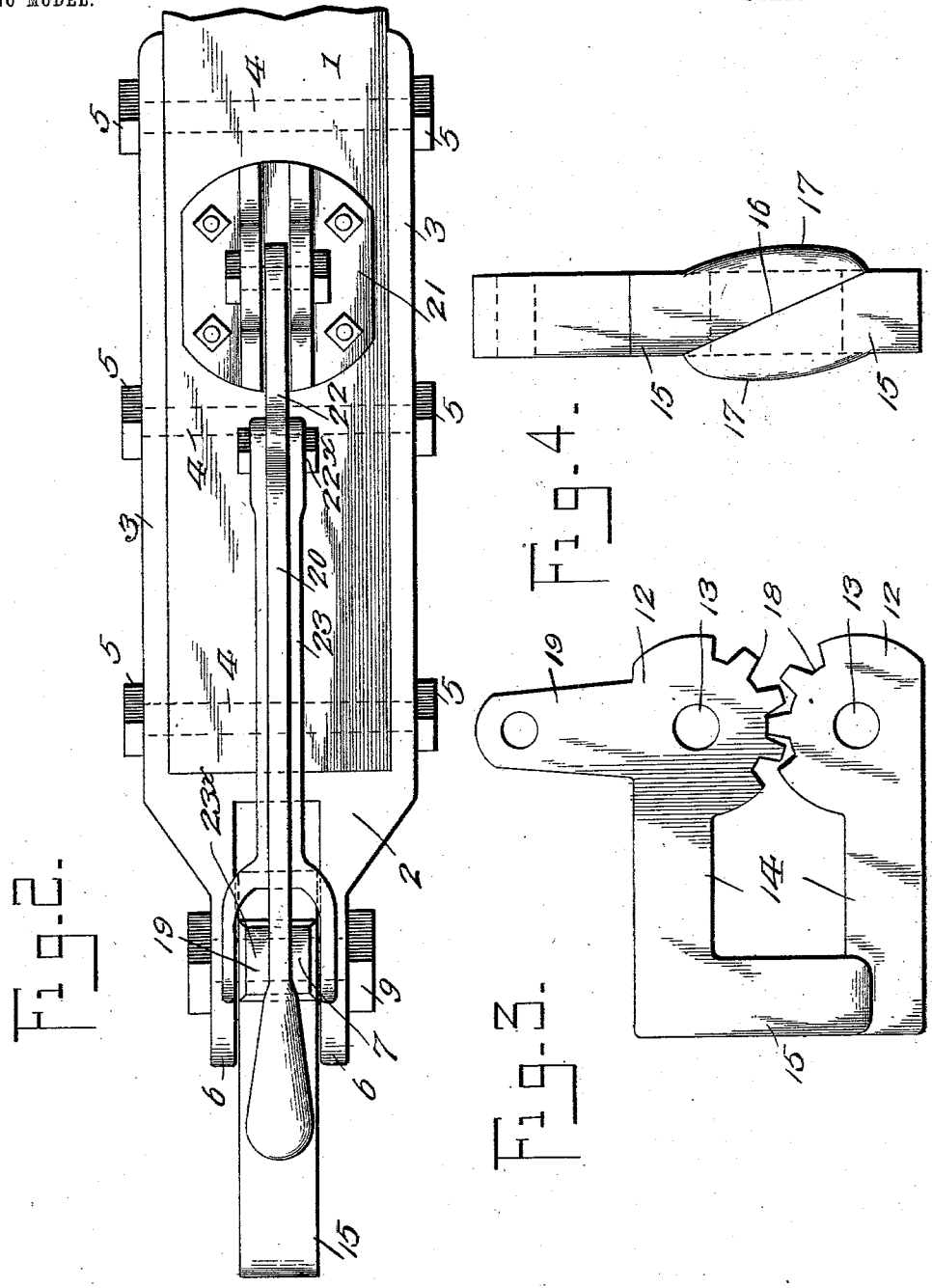
WITNESSES:
INVENTOR
Louis Kreitinger.
BY
Attorney No. 743,891. Patented November 10, 1903.

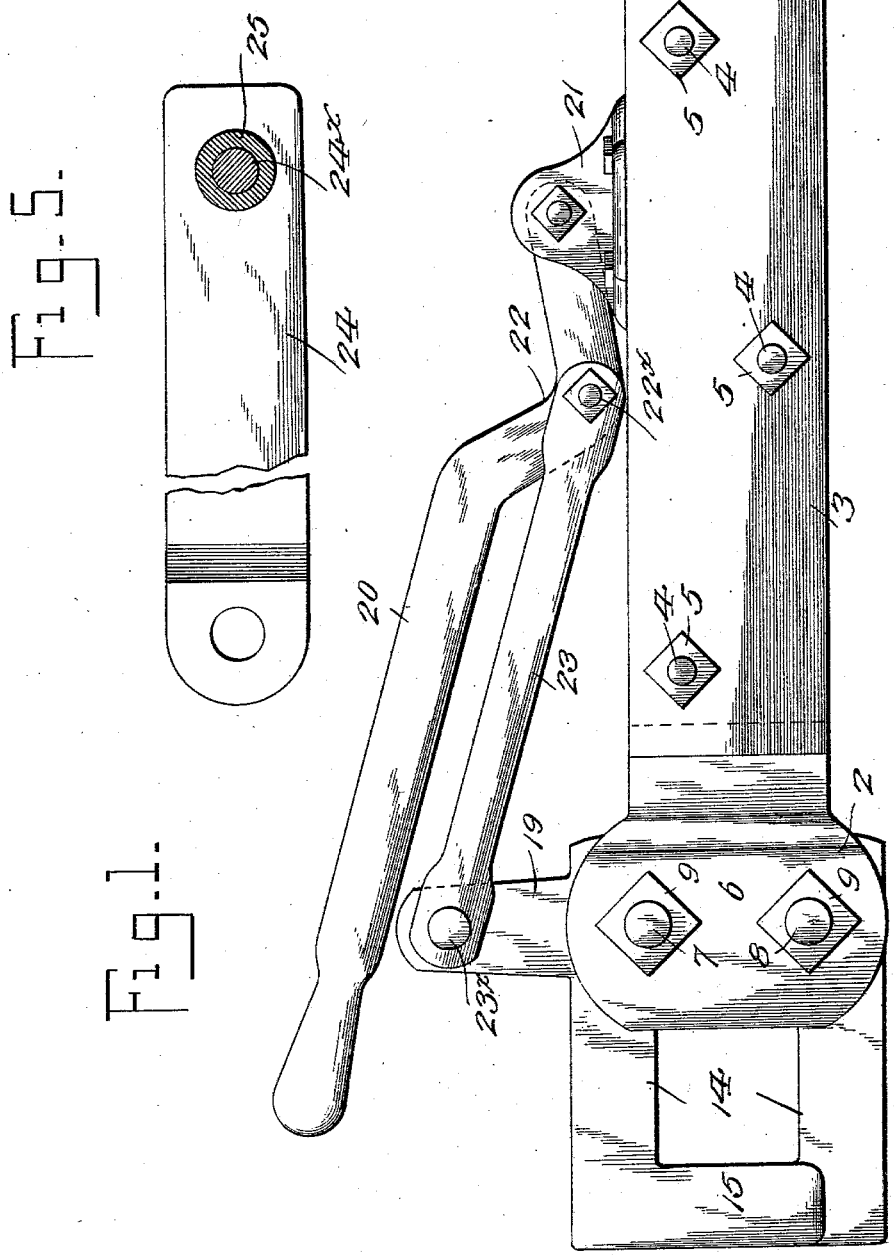

UNITED STATES PATENT OFFICE.

LOUIS KREITINGER, OF SPRINGFIELD, MINNESOTA.

DRAFT-COUPLING.

SPECIFICATION forming part of Letters Patent No. 743,891, dated November 10, 1903.

Application filed February 11, 1903. Serial No. 142,917. (No model.)

*To all whom it may concern:*

Be it known that I, LOUIS KREITINGER, a citizen of the United States, residing at Springfield, in the county of Brown and State of Minnesota, have invented new and useful Improvements in Draft-Couplings, of which the following is a specification.

My invention has relation to new and useful improvements in draft-couplings, and is especially designed and constructed to be used in connection with movable agricultural machinery, such as is employed in threshing, whereby such machinery may be coupled to a suitable draft device for transportation.
While I have just stated the especial purpose of my invention, I do not desire it to be understood that I limit myself to such use, inasmuch as the invention may be employed with various agricultural implements—such as plows, mowers, &c.—and with road or other vehicles, wherever such a coupling may be required and may as readily serve as a coupling for connection with the harness of a draft-animal as with means of power locomotion.

The object of the invention is to provide a coupling or connection of the kind mentioned which is simple and strong in construction, efficient in operation, and which will permit of a ready attachment to the draft means when it is desired to move the machinery or implement upon which the coupling is employed from place to place and which may be easily and quickly detached from the draft means when desired or when necessity requires.

The invention consists in providing the draft-pole or tongue of a threshing-machine, agricultural implement, or vehicle with a pair of oppositely-disposed jaws adapted and arranged to be closed upon each other, and thereby coact to couple the pole or tongue to the draft means, or be moved away from each other when it is desired that the tongue be released and a suitable means for operating the jaws to close and open the same and to lock them in closed relation.

I have fully and clearly illustrated my invention in the accompanying drawings, forming a part of this specification, and wherein—

Figure 1 is a view in side elevation showing my invention attached to a draft-pole or tongue of ordinary construction, the jaws of the coupling being shown as closed. Fig. 2 is a top plan view of the invention. Fig. 3 is a detail view, in side elevation, showing the coupling-jaws detached from their bearings, the jaws being in closed relation. Fig. 4 is a detail view of the jaws, in end elevation, showing the construction of the free or bearing ends of the jaws and their relation when closed. Fig. 5 is one means suitable for use as the member of the coupling to be employed upon the draft means.

Referring to the drawings, 1 designates a draft-pole or tongue of a threshing-machine, agricultural implement, or road-vehicle. This tongue or pole may be of any desired and well-known construction; but I have shown it as consisting of a beam, preferably rectangular in cross-section, to permit of a ready attachment of the coupling thereto.

The tongue or draft-pole as above described is provided at its free end portion with a suitable frame in which the jaws are mounted and upon which the operating means for closing and opening said jaws is arranged. It is not necessary that this frame be of any specific structure, since its object may be accomplished in a variety of ways, but I have shown it as consisting of a plate 2, fitted snugly against the free end of the pole or tongue. Extending rearwardly from the plate 2 and closely embracing opposite sides of the tongue are arms or securing-straps 3 3, which extend for a suitable distance along the tongue and are securely fastened in position thereon by means of transversely-arranged headed bolts 4, extending through the straps and tongue and locked by means of nuts 5.

Upon its front face the plate 2 is formed or provided with forwardly-projected plates or members 6 6, substantially at right angles to said plate and which may be of any size or form to accomplish the purposes for which they are intended. These plates are provided at points preferably adjacent their upper and lower edges with vertically-arranged openings, the said openings in one plate being in alinement with the corresponding openings in the opposite plate. Through these openings are projected upper and lower transversely-disposed bearing-pins 7 8, which are held against longitudinal displacement by any suitable means, as nuts 9.

Pivotally supported upon the bearing-pins 7 and 8 are upper and lower coupling-jaws, both of which are arranged to swing in a vertical plane and be moved toward or away from each other, accordingly as the coupling is to be closed or opened. While the specific structure as to form and contour of these jaws is immaterial, I have shown them as consisting of main or body portions 12, each of which is provided with an aperture 13, through which the bearing-pins above referred to extend. From the body portions project forwardly-extending arms 14 14, provided at their extreme free ends with knuckle pieces or members 15, which are arranged at an approximate right angle to the arms 14, thus providing the jaws with hooked ends, which are so formed as to overlap each other when in closed relation in order that a clevis or other device to which the coupling is attached will bear upon both jaws, whereby the strain is equally distributed thereon. As providing a convenient and efficient manner of overlapping the jaws I incline or chamfer transversely their contiguous meeting faces, as at 16, and in order to compensate for the material thus removed and to prevent weakening of the parts I form the outer faces of the jaws at points opposite to the inclined faces 16 with thickened or enlarged portions 17, substantially as shown in Fig. 4 of the drawings.

At their rear ends and adjacent to their pivots the jaws are provided with mutilated gears 18, said gears being arranged in positive engagement with each other, whereby a simultaneous movement of the jaws is accomplished—that is to say, when one jaw is moved in the direction to release the coupling the opposite jaw is swung in the opposite direction and when one of the jaws is swung to close the coupling the other will be moved correspondingly until the hooked ends are overlapped and the coupling securely made.

I will now describe the means for operating the coupling-jaws. Upon the upper jaw is formed or secured a substantially vertically-extending arm or post 19, to which the means for operating the jaws is secured. This means comprises a hand or operating lever 20, provided with a suitable fulcrum 21, which is securely mounted upon the upper side of the draft-tongue. This lever is provided at a point intermediate its free end and its fulcrum with an angular bend 22, which bend is so arranged as to be out of alinement with the fulcrum and the longitudinal axis of the lever and to assume a position below the fulcrum 21 when the lever is thrown forwardly to close the coupling, as shown in Fig. 1. Pivotally connected at its respective ends to the lever 20 at the apex of the angular bend 22, as at $22^\times$, and the arm or post 19, as at $23^\times$, is a connecting-rod 23, by means of which the said lever and the jaws are operatively connected and leverage is transmitted from the operating-lever to the coupling-jaws to open and close the same.

In Fig. 5 of the drawings I have shown the portion of the coupler which is mounted upon the draft means. This portion consists of a clevis 24 of a well-known form provided with the usual cross-pin $24^\times$, upon which is placed an antifriction-sleeve 25 in order to reduce the wear of the engaging parts incident to the movements of the coupling elements when connected. This clevis may be attached to the draft means in any suitable manner, and therefore I have not illustrated this feature in the drawings.

While it is believed that the operation will be apparent from the above description, taken in connection with the drawings, nevertheless it may be stated concisely as follows: When it is desired to couple the object to which the coupling is attached to the draft means, the operating-lever 20 is pulled upwardly, and by so doing the connecting-bar 23 is drawn rearwardly, the pull exerted by the said bar serving to throw the post 19 backwardly, whereby the upper jaw of the coupling is swung vertically. By swinging the said jaw in the direction indicated and by reason of the engagement of the mutilated gears 18 the lower jaw is simultaneously with the upward movement of the upper jaw thrown downwardly and the jaws spread to receive the opposing member of the coupler preparatory to making the coupling. After engagement has been made between the coupling members by passing the cross-pin of the clevis 24 within the jaws of the coupler the lever 20 is then swung forwardly and the jaws are simultaneously thrown toward each other to assume a closed position to effect the coupling.

It will be seen from the above description that when the lever 20 is thrown forwardly to close the jaws and reaches the limit of its movement, or approximately so, the point of connection between the connecting-bar 23 and the lever 20—that is to say, the bend 22—will be thrown below the fulcrum-point 21, and will thereby assume a position out of alinement with said fulcrum 21 of said lever and the pivotal point $23^\times$ at which the bar 23 is united to the post 19. This structure and arrangement of the operating-lever and the connecting-bar just mentioned serves to hold the jaws closed, and thereby prevents the accidental detachment of the coupler, for the reason that the connecting-bar is prevented from any movement to the rear, which is necessary to the spreading of the jaws, as long as the point of connection $22^\times$ remains below a straight line extending from the fulcrum 21 to the point $23^\times$ at which the connecting-bar is secured to the post 19.

What I claim as new, and desire to secure by Letters Patent, is—

1. In a coupling, the combination with a draft member, of oppositely-arranged pivoted jaws having hooked portions adapted to engage each other, means to swing one of the jaws, and means connecting the jaws whereby the movement of one jaw imparts a corresponding movement to the opposite jaw.

2. In a coupling, the combination with a draft member, of oppositely-arranged pivoted jaws provided with hooked ends adapted to engage each other, said jaws being provided with engaging portions to insure a simultaneous movement and means for opening and closing the coupling.

3. In a coupling, the combination with a draft member, of oppositely-arranged pivoted jaws formed with overlapping reinforced ends having transversely-inclined engaging faces, and means to operate the jaws.

4. In a coupling, the combination with a draft member, of oppositely-arranged pivoted jaws which swing in the same plane, and are formed with overlapping ends, means to insure a simultaneous movement of said jaws, and means to operate the jaws.

5. In a coupling, the combination with a draft member, of oppositely-arranged pivoted jaws having a simultaneous movement on their pivots toward and away from each other, and means to open and close the jaws, said means including a means for locking the jaws in closed position.

6. In a coupling, the combination with a draft member, of oppositely-arranged pivoted jaws, means to insure a simultaneous movement of said jaws, an operating-lever to operate the jaws, and means for connecting said lever and jaws, said lever and means being so constructed as to include a lock for the jaws when in closed position.

7. In a coupling, the combination with a draft member, of oppositely-arranged pivoted jaws, means to insure a simultaneous movement of said jaws, an operating-lever fulcrumed on the draft means, said lever being provided with a lateral extension and a connecting-bar secured to said extension and one of the jaws.

8. In a coupling, the combination with a draft member, of oppositely-arranged pivoted jaws, said jaws being provided with intermeshing mutilated gears and one of said jaws being provided with a post, an operating-lever fulcrumed on the draft means and provided with a lateral extension and a connecting-bar secured to the extension on the lever and the post on the jaw.

9. In a coupling, a frame comprising a plate provided with rearwardly-extending straps, and forwardly-projecting members in a plane at right angles to the plate.

10. In a coupling, the combination with a draft member, of a frame comprising a base-plate provided with rearwardly-extending straps, secured to the draft means, and forwardly-projecting plates, oppositely-arranged jaws pivoted between the last-named plates, said jaws being provided with intermeshing mutilated gears, and one jaw with a post, an operating-lever fulcrumed on the draft member, and formed with a lateral extension and a connecting-bar secured to said post and extension.

In testimony whereof I affix my signature in presence of two witnesses.

LOUIS KREITINGER.

Witnesses:
A. FREDERICKSON,
JOS. KREITINGER.